Aug. 7, 1962 P. L. BRIGMON 3,048,439
PORTABLE CANOPY
Filed March 10, 1961
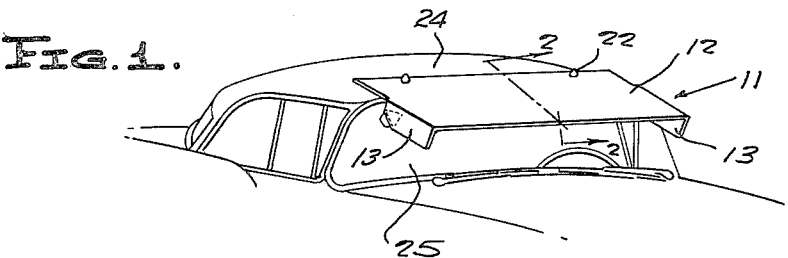
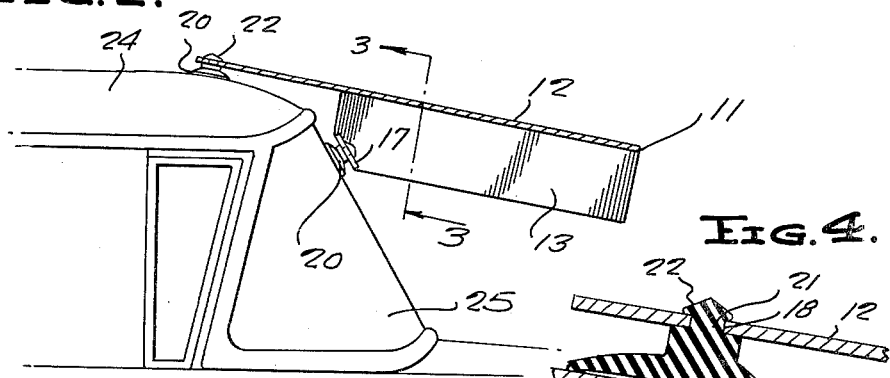
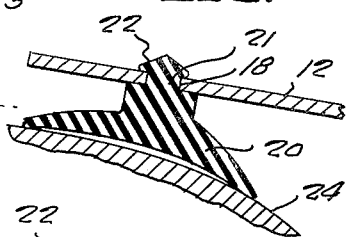
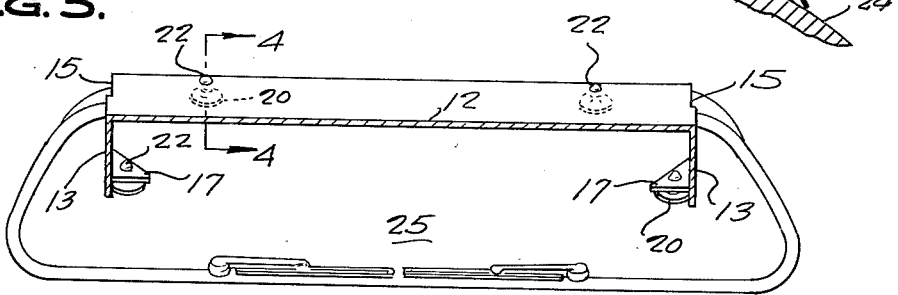
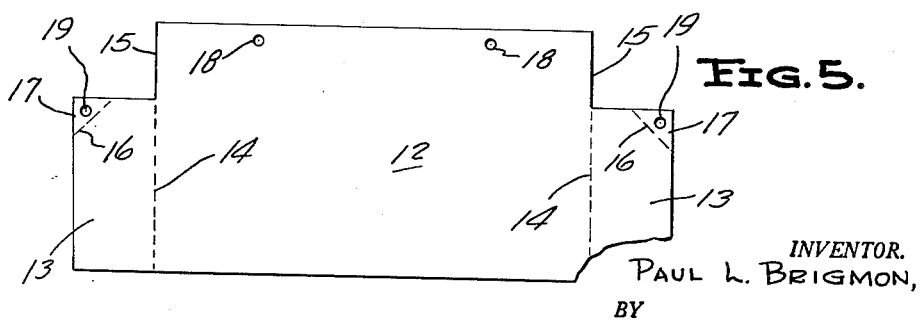
INVENTOR.
PAUL L. BRIGMON,
BY
*McMorrow, Berman & Davidson*
ATTORNEYS.

United States Patent Office 3,048,439
Patented Aug. 7, 1962

3,048,439
PORTABLE CANOPY
Paul L. Brigmon, 3965 Ardmore Ave., Cincinnati, Ohio
Filed Mar. 10, 1961, Ser. No. 94,820
1 Claim. (Cl. 296—95)

This invention relates to visors for motor vehicles, and more particularly to a temporary or removable rain visor for an automobile for use in protecting the windshield of the automobile or any other portion thereof from rain, for example, when the vehicle is parked in a drive-in theatre or in a drive-in restaurant.

A main object of the invention is to provide a novel and improved rain visor device for a motor vehicle, said device being simple in construction, being easy to install, and being highly effective in protecting a subjacent surface, such as a windshield, or the like, from rain, snow or sleet.

A further object of the invention is to provide an improved visor device for temporary attachment to a motor vehicle adjacent the windshield or adjacent a window thereof, the visor device being inexpensive to manufacture, being relatively durable in construction, and being provided with means for quickly installing same on the vehicle and for quickly and easily removing same when its use is no longer required.

Further objects and advantages of the invention will become apparent from the following description and claim, and from the accompanying drawings, wherein:

FIGURE 1 is a fragmentary view of an automobile equipped with an improved rain visor device constructed in accordance with the present invention, the device being shown installed over the vehicle windshield.

FIGURE 2 is an enlarged vertical longitudinal cross sectional view taken substantially on the line 2—2 of FIGURE 1.

FIGURE 3 is a transverse cross sectional view taken substantially on the line 3—3 of FIGURE 2.

FIGURE 4 is an enlarged cross sectional detail view taken substantially on the line 4—4 of FIGURE 3.

FIGURE 5 is a fragmentary plan view of the main body of the rain visor device shown in FIGURES 1 to 4.

Referring to the drawings, the improved rain visor device is designated generally at 11 and comprises a generally rectangular body of relatively rigid sheet material, such as cardboard, or the like, suitably coated with wax or other waterproofing coating material, the cardboard or other material employed for said main body being of a relatively rigid type. The main body of the device, which is designated at 12, is provided with respective side flaps 13, 13 which are located at the forward portions of the side edges of the main body 12 and which are bendable downwardly by the provision of crease lines 14, 14 at the opposite side portions of the main body, forming continuations of the respective side edges 15, 15. The crease lines 14 may be formed by suitably weakening the main body along the lines, for example, by bending or scoring the body 12 at the locations of said lines.

The side flaps 13, 13 are further formed with crease lines 16, 16 at their respective rear corner portions, the crease lines extending diagonally, as illustrated in FIGURE 5, so as to define respective corner flaps 17, 17 which may be bent inwardly in the manner illustrated in FIGURE 5.

The main body 12 is formed at its rear margin with a pair of apertures 18, 18, said apertures being located adjacent the respective opposite rear corners of the main body, namely, being spaced symmetrically on opposite sides of the longitudinal center line of said main body, as is clearly apparent from FIGURE 5. The triangular flap elements 17, 17 are likewise provided with circular apertures 19, 19 similar to the apertures 18, 18.

FIGURE 5 illustrates the blank employed for forming the rain visor device, said blank being suitably creased, as previously mentioned, at the crease lines 14 and 16. In setting up the device for use, the side flaps 13, 13 are folded downwardly so as to depend substantially perpendicularly from the main portion of body 12, and the triangular side flaps 17, 17 are bent inwardly on the crease lines 16, 16 so as to extend substantially perpendicularly to the side flaps 13, 13. Respective suction cups, shown at 20, 20 are then fastened to the rear margin of the main body 12 at the apertures 18, 18, the suction cups being provided with shank portions 21 which terminate in enlarged head portions 22, the shank portions 21 being adapted to be forced into the apertures 18, 18 from below by forcing the head portions 22 upwardly through said apertures. The suction cups 20, 20, as well as the additional suction cups 20, 20 employed with the triangular flap elements 17, 17 are made of suitable relatively soft flexible material, such as soft latex rubber or the like.

As shown in FIGURES 1 and 2, the canopy device 11 is mounted with the rear marginal portion thereof overlying the automobile roof 24 and with the forward portion thereof, including the depending side flaps 13, 13 overlying the automobile windshield 25. The suction cups 20 are engaged on the forward marginal portion of the vehicle roof and the additional suction cups associated with the inwardly extending triangular flaps 17 are likewise engaged on the windshield 25 with the inwardly extending flaps 17, 17 extending substantially parallel to the windshield, the device being arranged so that its main body 12 slopes downwardly and forwardly in the manner illustrated in FIGURE 2.

As will be readily apparent, the additional suction cups 20 employed with the flaps 17 are installed in the same manner as the first-mentioned suction cups, said additional suction cups having the enlarged head portions 22 which are forced upwardly through the apertures 19 so that the shank portions of the suction cups are received in said apertures and so that the enlarged cup-like bottom portions are in positions to engage on the windshield 25. Thus, the device may be quickly installed over a windshield in the manner illustrated in FIGURE 1 so as to protect the windshield against rain, snow, or sleet, and to afford unimpaired visibility through the windshield.

The canopy device may be similarly mounted in a position extending laterally from the automobile and overlying a side window thereof so as to cover a tray mounted on the bottom margin of the window, for example, in a drive-in restaurant.

As above mentioned, the main body 12 may be formed of suitable cardboard which is provided with a waterproof coating, such as a suitable wax.

While a specific embodiment of an improved portable rain visor device for automobiles has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A rain visor for automobiles comprising a generally rectangular flat body of rigid cardboard coated with waterproofing material, said body being adapted to be disposed over a vehicle windshield with the rear marginal portion thereof extending over the forward portion of the vehicle roof, said body being formed at the forward portions of its side margins with flaps having rear outer corner portions and being provided with transverse crease lines defining the inside edges of said flaps, whereby the flaps are foldable downwardly to a depending position substantially perpendicular to the main portion of the body, the lower rear corner portions of the depending flaps being formed with diagonal crease lines to define triangular corner flaps, said corner flaps being foldable inwardly to positions substantially parallel to the vehicle windshield, respective suction cups secured to the rear marginal portions of said body adjacent the opposite rear corners of the body and adapted to be engaged on the vehicle roof, and respective additional suction cups secured to said triangular corner flaps and arranged to engage on the vehicle windshield.

References Cited in the file of this patent

UNITED STATES PATENTS

| | | |
|---|---|---|
| 1,119,177 | Krafft | Dec. 1, 1914 |
| 2,121,264 | Rubottom | June 21, 1938 |
| 2,318,143 | Cutting | May 4, 1943 |